United States Patent [19]

Morel et al.

[11] Patent Number: 4,783,054
[45] Date of Patent: Nov. 8, 1988

[54] PNEUMATIC DEVICE FOR FITTING CABLES IN A TUBE

[75] Inventors: Jacques Morel, Fontaine-Les-Ribouts; Didier Morel, Favieres, both of France

[73] Assignee: Establissements Morel - Ateliers Electromecaniques De Favieres, Chateauneuf-En-Thymerais, France

[21] Appl. No.: 56,064

[22] Filed: Jun. 1, 1987

[30] Foreign Application Priority Data

May 30, 1986 [FR] France ................. 86 07820

[51] Int. Cl.[4] ............................... B66F 3/00
[52] U.S. Cl. ................................. 254/134.4
[58] Field of Search ............... 254/134.4, 134, 3 FT, 254/8 R, 93 R, 93 H; 15/104.3 G, 104.35 N

[56] References Cited

U.S. PATENT DOCUMENTS 3,179,375  4/1965  Hamrick .
3,301,531  1/1967  Corsiglia ................. 254/134.4
4,018,421  4/1977  Tallman .................. 254/8 B
4,498,659  2/1985  Brockelsby .............. 254/134.4

FOREIGN PATENT DOCUMENTS 2191314  2/1974  France .
535642   2/1977  U.S.S.R. ................. 254/134.4

Primary Examiner—Robert C. Watson
Attorney, Agent, or Firm—Young & Thompson

[57] ABSTRACT

A pneumatic device for fitting cables in a tube with improved unit safety in the event of excess pressure, comprises a capsule adapted to be introduced inside a tube and connected to a line used to pull the cable inside the tube. A unit (9) has a connection (20) to a compressed air source and a compressed air outlet connector (18) adapted to be connected in a substantially sealing-tight relationship to one of the ends of the tube. The unit comprises a distributor (19, 23) for distributing compressed air to the outlet connector (18), this distributor co-operating with discharge structure (32, 28, 29) to discharge the compressed air from the unit (9) in the event of an excess pressure downstream of the unit outlet connector (18).

10 Claims, 3 Drawing Sheets

FIG_3

FIG_7

PNEUMATIC DEVICE FOR FITTING CABLES IN A TUBE

This invention relates to a pneumatic device for fitting electric or telephone cables in a protective tube, which is generally buried.

Known devices of this type comprise a capsule, generally known as a "pig", which is adapted to be introduced at one of the ends of the tube, the capsule being connected to a line used to pull the cable inside the tube.

These known devices also comprise a unit commonly known as a "pig thrower" having means for connection to a compressed air source and a compressed air outlet connector which is adapted to be connected in substantially sealing-tight relationship to one of the ends of the tube.

When the operator admits compressed air to the unit, the air penetrates inside the tube and propels the capsule to the other end of the tube, the line being pulled behind it. All that is necessary then is to pull on the line to engage the cable inside the tube.

The known devices have the disadvantage of exposing the operator responsible for using these devices to the risk of serious injuries.

In the event of obstruction of the tube (without the operator being able to see it), the pressure rises very rapidly inside the tube, and this inevitably results in very vigorous ejection of the unit or pig thrower in the rearward direction, i.e. towards the operator, who is normally situated just behind the unit.

This very vigorous ejection is likely to cause very serious injury to the operator.

The object of this invention is to provide a pneumatic device for fitting cables in a tube to guarantee the user total safety, the device being of simple construction and easy to use.

The device according to the invention for fitting a cable in a tube comprises a capsule adapted to be introduced inside the tube and connected to a line used to pull the cable inside the tube, a unit provided with means for connection to a compressed air source and a compressed air outlet connector being adapted to be connected in substantially sealing-tight relationship to one of the ends of the tube.

According to the invention, this unit is characterized in that said unit comprises means for distributing compressed air to the outlet connector, said means co-operating with means to discharge the compressed air from the unit in the event of an excess pressure downstream of the unit outlet connector.

Thus in the event of any excess pressure inside the tube, the compressed air escapes to the exterior of the unit without any risk of being roughly ejected from the tube and causing serious injury to the operator.

According to a preferred embodiment of the invention, the device comprises a chamber in which a compressed air distributor is mounted slidably between two abutments, said chamber having a lateral intake port, one of the ends of said chamber communicating with the outlet connector and the other end of said chamber communicating with a tube provided with means for closing the compressed air passage. A lateral exhaust port is provided between the lateral intake port to the chamber and the end thereof adjacent the connector. A ring is disposed inside the chamber and around the distributor and is slidable together with the distributor into a position in which said ring and said distributor define between them a free passage for the compressed air to the connector and in which the ring closes the lateral exhaust port. In the event of an excess pressure downstream of the chamber the ring can slide into a position situated upstream of the previous position in which said ring frees the lateral exhaust port.

According to one advantageous embodiment of the invention, the tube communicating with one of the ends of the chamber is a flexible tube which can be clamped by the user to close the compressed air passage.

As a result of this flexible tube, the operator can work some distance from the unit so that he does not run the risk of being injured in the event of the unit being vigorously ejected in the event of any malfunction.

When the flexible tube is not clamped the compressed air escapes solely to the exterior of the unit.

To inject compressed air inside the tube the user simply clamps the flexible tube to close it, thus automatically pressurizing the unit. This pressure causes the distributor and the ring to slide forwardly, so that compressed air is injected via the passage created between the distributor and the ring.

Other features and advantages of the invention will be apparent from the following description.

In the accompanying drawings, which are given by way of example without limiting force:

FIG. 7 is an end view of the unit.

Figure 1:
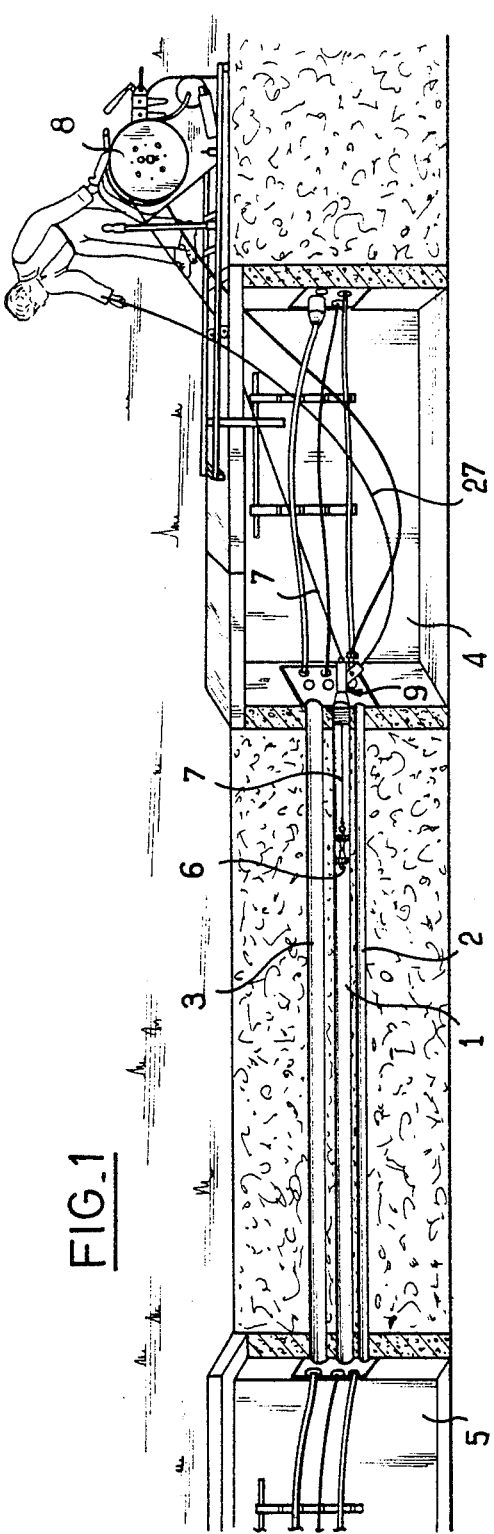
FIG. 1 is a perspective in longitudinal section showing a site for fitting cables inside underground tubes by means of a device according to the invention.

Referring to FIG. 1, underground tubes 1, 2, 3 are adapted to receive cables, e.g. telephone cables. These tubes 1, 2, 3 extend between inspection holes 4, 5, which it is possible to enter.

To fit a cable in a tube such as tube 1, a capsule 6 or "pig" connected to a line 7 is first introduced into the tube, the line 7 in turn being connected to a reel 8 situated outside the inspection hole 4.

As shown in FIG. 1 a unit 9 connected by a flexible pipe 10 to a compressor generating compressed air at a pressure of the order of 6 bars is placed at the end of tube 1.

Figure 2:
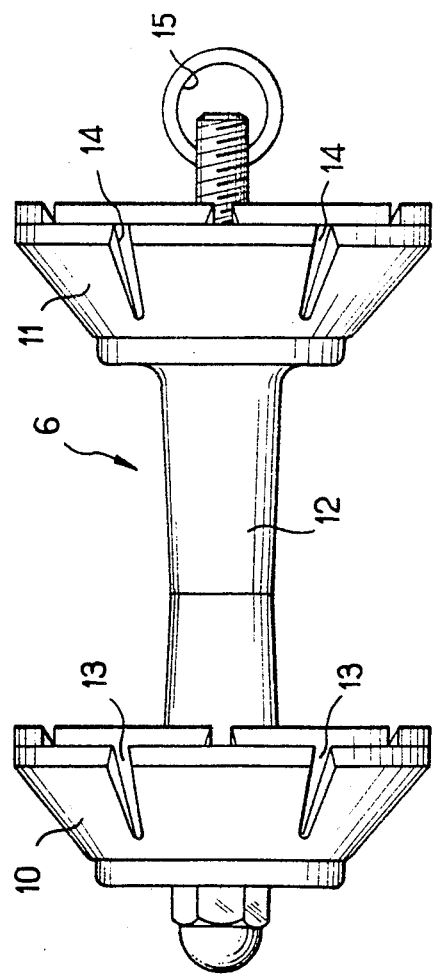
FIG. 2 is a plan view of the capsule of the device according to the invention.
Figure 3:
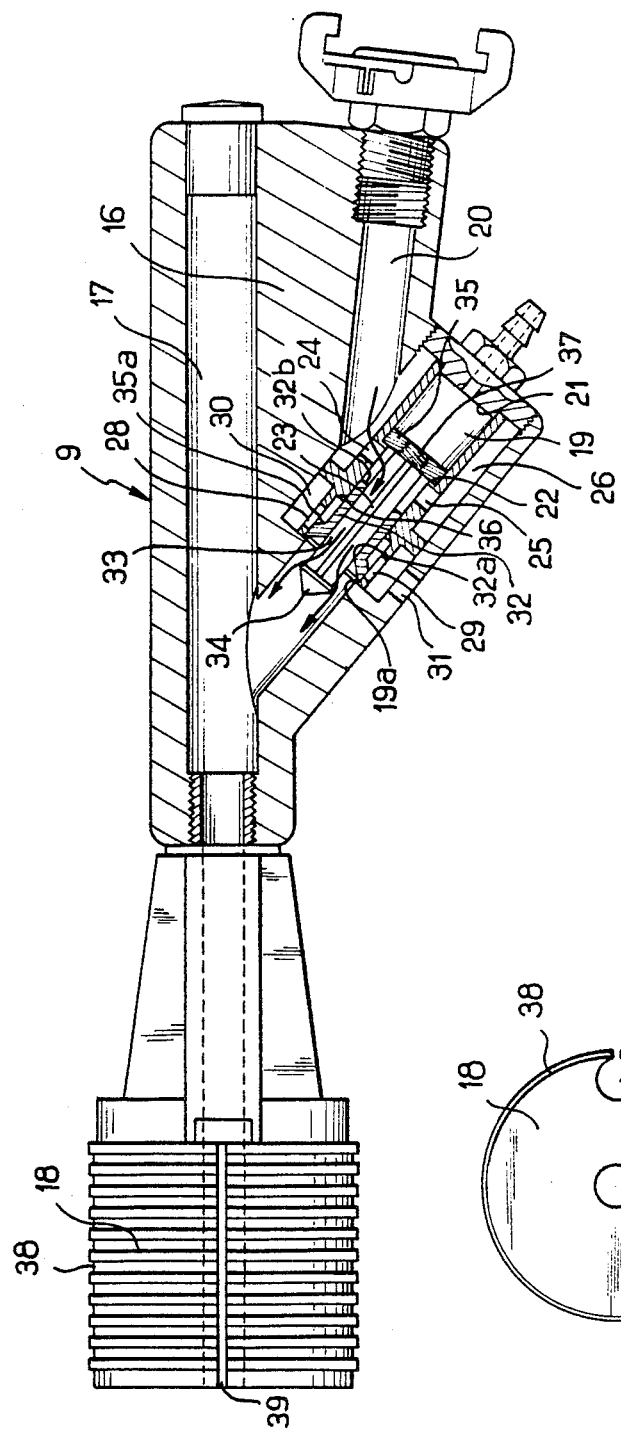
FIG. 3 is a partial longitudinal section of the unit of a device according to the invention.

The capsule 6 and the unit 9 are shown in greater detail in FIGS. 2 and 3. The capsule 6, which is made from plastics, comprises two frusto-conical parts 10, 11, flaring out in the rearward direction, these two parts being interconnected by an axial sleeve 12. The frusto-conical parts 10, 11 are provided with radial slots 13, 14 which give these parts some elasticity which promotes good sealing-tight relationship with the inside surface of the tube 1.

The rear of the capsule 6 comprises a ring 15 to which the line 7 is adapted to be secured.

Unit 9, which is shown in detail in FIG. 3, comprises a body 16 formed with a longitudinal duct 17 discharging to the exterior via a connector 18 intended for connection in substantially sealing-tight relationship to the end of the tube 1.

A chamber 19 communicating by means of an intake conduit 20 and a flexible pipe with the compressed air compressor leads into the duct 17.

A compressed air distributor 23 is mounted slidably between two abutments 21, 22 in chamber 19. Chamber 19 is formed with two lateral intake ports 24, 25 which communicate via an annular chamber 26 with the intake duct 20.

The end 21 of the chamber 19 remote from the connector 18 communicates with a tube 27 (see FIGS. 4 to 6) having means for closing the compressed air passage, and these means will be described in greater detail hereinafter.

Between the lateral intake ports 24, 25 in chamber 19 and the end 19a thereof adjacent the connector 18 there are provided two lateral exhaust ports 28, 29 which lead to the exterior via an annular compartment 30 and an orifice 31.

A ring 32 slidable together with the distributor 23 into a position in which the ring and the distributor 23 define between them a free passage 23 for the compressed air towards the connector 18 and in which the ring 32 closes the lateral exhaust ports 28, 29 as shown in FIG. 3, is disposed inside the chamber 19 and around the distributor 23.

Figure 6:
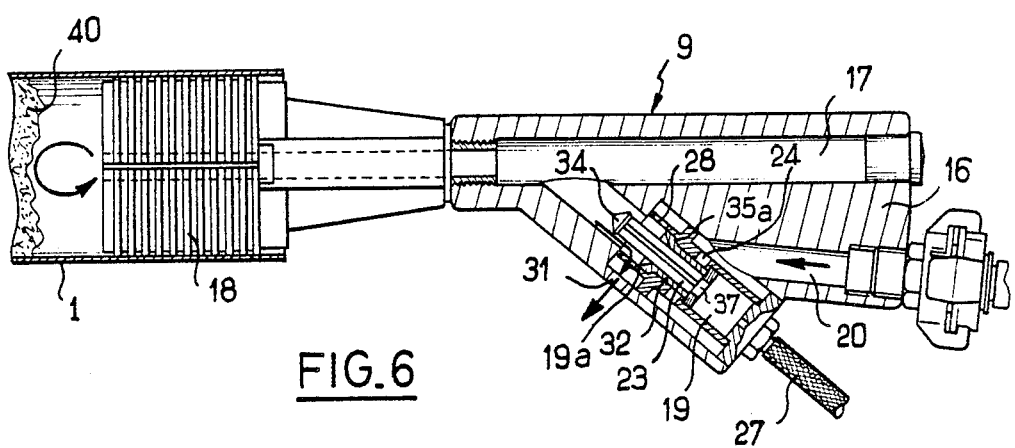
FIG. 6 is a similar view to FIGS. 4 and 5 with the unit in the exhaust position, because of an obstruction in the tube.

In the event of an excess pressure downstream of chamber 19, ring 32 can slide into a position situated upstream of the previous position in which said ring frees the lateral exhaust ports 28, 29 as shown in FIG. 6.

Figure 5:
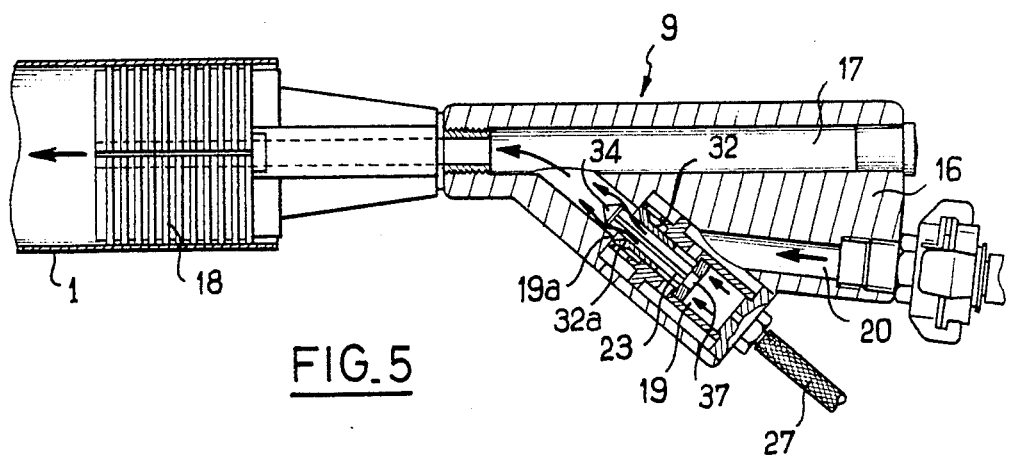
FIG. 5 is a similar view to FIG. 4 but with the unit in the normal operating position.

The tube 27 communicating with the end 21 of the chamber 19 is a flexible tube which can be clamped by the user to block the compressed air passage as shown in FIGS. 5 and 6.

Figure 4:
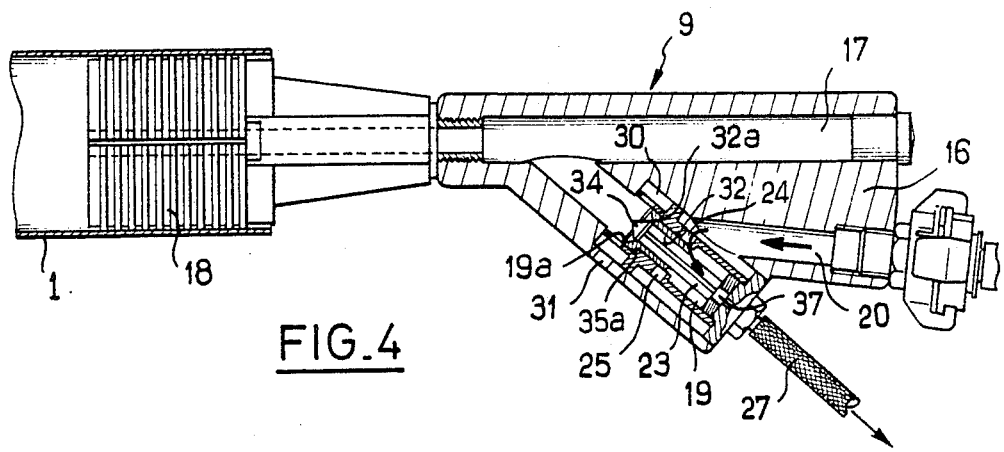
FIG. 4 is a longitudinal section of a unit according to the invention, the outlet connector of which is fitted inside a tube, the unit being in the inoperative position.

It will also be seen, particularly from FIG. 4, that the downstream end 34 of the distributor 23 is so shaped as to provide a sealing-tight relationship with the downstream part 32a of the ring 32 when the distributor 23 abuts the end 21 of the chamber 19 adjacent the tube 27.

Also, the side surface of the distributor 23 is recessed to define the free compressed air passage 33 between the distributor 23 and the ring 32.

The rear part of the distributor 23 comprises a piston 35 forming an abutment which can bear against a shoulder 22 on the side surface of the chamber 19 situated slightly upstream of the lateral compressed air intake ports 24, 25 in chamber 19. Piston 35 is formed with an orifice 37 communicating with the lateral recesses of the distributor 23.

The downstream end of the ring 32 has a frusto-conical widened part 35a which can bear against a complementary shoulder 36 formed on the side surface of the chamber 19 downstream of the lateral exhaust ports 28, 29.

When this widened part 35a of ring 32 bears against shoulder 36, the end 32b of the ring 32 remote from the widened part 35a partially covers the lateral intake ports 24, 25.

Referring to FIGS. 3 to 7, the outlet connector 18 of unit 9 comprises a cylindrical sleeve 38 of elastic material, the outside diameter of which is slightly larger than the inside diameter of the tube 1, and which can be force-fitted in substantially sealing-tight relationship in the end of said tube 1.

FIG. 7 also shows that the outlet connector 18 is formed with a lateral slot 39 extending parallel to the axis of the outlet connector to guide the line 7. Slot 39 has a circular section opening to the exterior via a contraction which allows introduction of the line 7.

Operation of the above-described device will now be explained with reference to FIGS. 4 to 6.

It will be assumed that the capsule 6 is engaged in the tube 1 and that the line 7 is attached to the capsule 6. The operator introduces the outlet connector 18 of the unit into the end of the tube 1 after engaging the line 7 in the lateral slot 39.

In the inoperative position of the unit 9 (see FIG. 4) the piston 35 of the distributor 23 abuts the end 21 of chamber 19.

Also, ring 32 bears by its widened part 35a against the shoulder 36 of chamber 19 and the end 34 of distributor 23 closes the downstream end 32a of ring 32.

The compressed air from the compressor enters the chamber 19 through the intake ports 24, 25 and then escapes from said chamber via orifice 37 in piston 35 and by the flexible tube 27.

When the operator wishes to inject compressed air into the tube 1, he simply clamps the flexible tube 27 as shown in FIG. 5. This operation can be remote-controlled as shown in FIG. 1.

When the flexible tube 27 is closed, the compressed air pushes distributor 23 and ring 32 forwardly into the position shown in FIG. 5, in which the distributor 23 is locked by its piston 35, which abuts the abutment 22 and the ring 32 abuts the abutment 19a formed at the end of the slot 19.

The compressed air escapes from chamber 19 via the passage 33 formed between the ring 32 and the distributor 23, enters the longitudinal duct 17, and then the tube 1. The capsule 6 is propelled in the tube 1 to its other end. The line 7 secured to the capsule 6 is then attached to the cable and then the line 7 is pulled to introduce the cable into the tube 1.

If the inside of the tube 1 is obstructed as shown by reference 40 in FIG. 6, an excess pressure is created inside the tube 1 and this is likely to eject the unit 9 outwardly abruptly.

This risk is obviated because the ring 32 is immediately pushed rearwardly by the excess pressure as shown in FIG. 6. During this movement, the ring 32 frees the exhaust ports 28, 29 while the distributor 23 remains stationary. As a result of these exhaust ports 28, 29, the pressure inside the tube 1 downstream of the unit 9 is kept at a value which is, for example, less than or equal to 1.5 bars and the unit 9 is not exposed to the risk of ejection.

Consequently, an operator situated behind the unit 9 is not exposed to any risk of injury. The device according to the invention therefore guarantees users complete safety.

Of course the relative sections of the distributor 23, ring 32, ports 24, 25, 28, 29 and 37 which govern the respective movements of the distributor and ring are designed according to the admissible pressures.

Of course closure of the flexible tube 27 can be provided by means other than clamping the tube, e.g. a value controlled by mechanical, electrical or pneumatic means.

We claim:

1. A pneumatic device for fitting cables in a tube (1), comprising a capsule (6) adapted to be introduced inside the tube and connected to a line (7) used to pull the cable inside the tube, a unit (9) provided with means (20) for connection to a compressed air source and a compressed air outlet connector (18) being adapted to be connected in substantially sealing-tight relationship to one of the ends of the tube (1), said unit (9) comprising means (19, 23) for distributing compressed air to the outlet connector (18), said means co-operating with means (32, 28, 29) to discharge the compressed air from the unit in the event of an excess pressure downstream of the unit outlet connector (18), wherein the unit (9) comprises a chamber (19) in which a compressed air distributor (23) is mounted slidably between two abutments, said chamber having a lateral intake port (24), one (19a) of the ends of said chamber communicating with the outlet connector (18) and the other end (21) of said chamber communicating with a tube (27) provided with means for closing the compressed air passage, a lateral exhaust port (28) is provided between the lateral intake port (24) to the chamber (19) and the end thereof adjacent the connector, a ring (32) is disposed inside the chamber (19) and around the distributor (23) and is slidable together with the distributor (23) into a position in which said ring and said distributor define between them a free passage (33) for the compressed air to the connector and in which the ring (32) closes the lateral exhaust port (28), and in the event of an excess pressure downstream of the chamber (19) the ring (32) can slide into a position situated upstream of the previous position in which said ring frees the lateral exhaust port (28).

2. A device according to claim 1, wherein the tube (27) communicating with the said other end (21) of the chamber (19) is a flexible tube which can be clamped by the user to block the compressed air passage.

3. A device according to claim 1, wherein the downstream end (34) of the distributor (23) is shaped to provide a sealing-tight relationship with the downstream part (32a) of the ring (32) when the distributor (23) abuts the end (21) of the chamber adjacent the tube (27).

4. A device according to claim 3, wherein the side surface of the distributor (23) comprises at least one recess to define a free compressed air passage between the body and the ring (32).

5. A device according to claim 4, wherein the rear part of the distributor (23) comprises an abutment (35) adapted to bear against a shoulder (22) on the side surface of the chamber (19) situated slightly upstream of the lateral port (24) for the intake of compressed air into the chamber.

6. A device according to claim 1, wherein the downstream end of the ring (32) has a widened part (35a) adapted to abut a shoulder (36) formed on the side surface of the chamber (19) upstream of the lateral exhaust port (28).

7. A device according to claim 6, wherein when the widened part (35a) of the ring (32) bears against the shoulder (36) that end (32b) of the ring which is remote from the widened part partially covers the lateral intake port (24).

8. A device according to any claim 1 wherein the rear part (35) of the distributor (23) is formed with an orifice (37) which communicates with the lateral recess of the distributor (23).

9. A device according to claim 1, wherein the outlet connector (18) of the unit comprises a cylindrical sleeve (38) of elastic material, the outside diameter of which is slightly larger than the inside diameter of the tube (1), and which is adapted to be force-fitted into the end of said tube.

10. A device according to claim 1, wherein the outlet connector (18) has a lateral slot (39) extending parallel to the axis of said outlet connector to guide the line (7).

* * * * *